United States Patent
Jeon et al.

(10) Patent No.: US 12,472,926 B2
(45) Date of Patent: Nov. 18, 2025

(54) HYBRID ELECTRIC VEHICLE AND DRIVING CONTROL METHOD FOR SAME

(71) Applicants: HYUNDAI MOTOR COMPANY, Seoul (KR); KIA CORPORATION, Seoul (KR)

(72) Inventors: Sung Bae Jeon, Ansan-si (KR); Seong Wook Moon, Seoul (KR); Do Hwa Kim, Seoul (KR); Gyu Ri Lee, Namyangju-si (KR); Sung Il Jung, Busan (KR); Jae Young Park, Seongnam-si (KR); Jeong Eun Kim, Seoul (KR); Hui Un Son, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 260 days.

(21) Appl. No.: 18/103,934

(22) Filed: Jan. 31, 2023

(65) Prior Publication Data

US 2024/0075920 A1    Mar. 7, 2024

(30) Foreign Application Priority Data

Sep. 2, 2022   (KR) .................. 10-2022-0111600

(51) Int. Cl.
| | | |
|---|---|---|
| *B60W 20/13* | (2016.01) |
| *B60W 10/02* | (2006.01) |
| *B60W 10/06* | (2006.01) |
| *B60W 10/26* | (2006.01) |
| *B60W 20/15* | (2016.01) |

(52) U.S. Cl.
CPC ............ *B60W 20/13* (2016.01); *B60W 10/02* (2013.01); *B60W 10/06* (2013.01); *B60W 10/26* (2013.01); *B60W 20/15* (2016.01); *B60W 2710/244* (2013.01)

(58) Field of Classification Search
CPC ...... B60W 20/00; B60W 20/10; B60W 20/13; B60W 20/15; B60W 20/19; B60W 20/30; B60W 20/40
See application file for complete search history.

(56) References Cited

U.S. PATENT DOCUMENTS

| | | | |
|---|---|---|---|
| 10,407,051 B2 | 9/2019 | Sim et al. | |
| 2006/0214636 A1* | 9/2006 | Arai ................... | H01M 10/482 307/10.1 |

(Continued)

FOREIGN PATENT DOCUMENTS

| | | |
|---|---|---|
| JP | 2005178512 A | 7/2005 |
| KR | 20180067262 A | 6/2018 |
| KR | 20210005757 A | 1/2021 |

*Primary Examiner* — Ramya P Burgess
*Assistant Examiner* — Sara J Lewandroski
(74) *Attorney, Agent, or Firm* — Lempia Summerfield Katz LLC (57) ABSTRACT

A method for controlling driving of a hybrid electric vehicle includes collecting driving data while the hybrid electric vehicle is driven, determining whether the hybrid electric vehicle enters a first mode corresponding to emergency driving of the hybrid electric vehicle or a second mode corresponding to control in preparation for the emergency driving, and controlling the hybrid electric vehicle in accordance with a mode that the hybrid electric vehicle enters among the first mode and the second mode.

16 Claims, 4 Drawing Sheets

(56) References Cited

U.S. PATENT DOCUMENTS

| | | | | |
|---|---|---|---|---|
| 2007/0124037 A1* | 5/2007 | Moran | ................ | B60W 10/06 701/22 |
| 2008/0059032 A1* | 3/2008 | Hofmann | ............ | F16H 61/0213 701/55 |
| 2010/0051363 A1* | 3/2010 | Inoue | .................... | B60L 50/16 180/65.21 |
| 2011/0203400 A1* | 8/2011 | Ahner | .................... | B60K 6/387 74/473.1 |
| 2012/0053768 A1* | 3/2012 | Jeon | .................... | B60W 10/08 903/903 |
| 2012/0105006 A1* | 5/2012 | Hara | ..................... | H01M 4/587 903/903 |
| 2012/0109435 A1* | 5/2012 | Mikulec | .................. | B60K 6/48 180/65.265 |
| 2012/0197513 A1* | 8/2012 | Gatti | .................... | B60W 20/12 180/65.28 |
| 2013/0138282 A1* | 5/2013 | Shin | ..................... | B60W 20/00 180/65.265 |
| 2013/0225366 A1* | 8/2013 | Zollner | ................ | B60W 10/11 477/79 |
| 2014/0176085 A1* | 6/2014 | Maruno | .................. | B60R 16/00 320/162 |
| 2014/0303822 A1* | 10/2014 | Kawamura | ........... | B60W 20/40 180/65.265 |
| 2014/0324305 A1 | 10/2014 | Larsson | | |
| 2015/0065295 A1* | 3/2015 | An | ........................ | B60W 10/02 180/65.265 |
| 2015/0088339 A1* | 3/2015 | Fisher | .................... | G16H 40/67 701/2 |
| 2017/0001537 A1* | 1/2017 | Ahn | ........................ | B60L 50/52 |
| 2017/0036662 A1* | 2/2017 | Chen | .................... | B60W 10/06 |
| 2018/0134163 A1* | 5/2018 | Kuribara | ................. | B60L 53/14 |
| 2018/0162357 A1 | 6/2018 | Sim et al. | | |
| 2018/0162371 A1* | 6/2018 | Colavincenzo | ..... | B60L 15/2054 |
| 2018/0170382 A1* | 6/2018 | Soliman | ............. | B60L 15/2045 |
| 2019/0070972 A1* | 3/2019 | Lee | ........................ | B60W 10/26 |
| 2019/0152470 A1* | 5/2019 | Liu | ........................ | B60W 10/06 |
| 2019/0202469 A1* | 7/2019 | Klucsarits | ......... | B60W 50/0098 |
| 2020/0070679 A1* | 3/2020 | Wang | ..................... | B60L 58/21 |
| 2020/0122707 A1* | 4/2020 | Jost | ........................ | B60W 20/50 |
| 2021/0245729 A1* | 8/2021 | Campbell | ............. | B60W 10/06 |
| 2021/0331694 A1 | 10/2021 | Moriya et al. | | |
| 2022/0234436 A1* | 7/2022 | Nishihiro | ............ | B60L 50/10 |

\* cited by examiner

HYBRID ELECTRIC VEHICLE AND DRIVING CONTROL METHOD FOR SAME

CROSS REFERENCE TO RELATED APPLICATIONS

The present application claims priority to and the benefit of Korean Patent Application No. 10-2022-0111600, filed on Sep. 2, 2022, the entire contents of which are incorporated herein by reference.

FIELD

The present disclosure relates to a hybrid electric vehicle that can be mainly driven in an emergency driving situation and a driving control method for the same.

BACKGROUND

Recently, with growing interest in the environment, eco-friendly vehicles that have an electric motor as a power source have becoming more popular. Eco-friendly vehicles are also referred to as electrified vehicles, and a representative example thereof is a hybrid electric vehicle (HEV) or an electric vehicle (EV).

Since such an electrified vehicle is provided with a motor differently from a conventional internal combustion engine (ICE) vehicle, the electrified vehicle may obtain power required for propulsion using the motor. In particular, in the case of a hybrid electric vehicle in which an engine is provided together with a motor, fuel efficiency may be improved by performing mode switching between an EV mode in which only the motor is driven and an HEV mode in which the motor is selectively used while the engine is driven, depending on driving conditions. In order to drive the motor in each mode, the hybrid electric vehicle may be provided with a battery. Accordingly, the hybrid electric vehicle may drive the motor by using a state of charge (SOC) of the battery variably depending on driving conditions by controlling the SOC of the battery to be maintained at a predetermined level.

Such hybrid electric vehicles may be used in various environments with control requirements. For example, when a hybrid powertrain is used in an ambulance, higher power performance may be required in a patient transfer situation as compared to a normal driving situation, and differentiated control may be required in the patient transfer situation or a standby situation in preparation for transferring the patient. In an emergency situation such as a patient transfer situation, the battery's SOC is required to be sufficient to allow the motor to be actively involved in driving to satisfy high power performance.

The foregoing is intended merely to aid in the understanding of the background of the present disclosure, and is not intended to mean that the present disclosure falls within the purview of the related art that is already known to those having ordinary skill in the art.

SUMMARY

An objective of the present disclosure is to provide a hybrid electric vehicle that can be mainly driven in an emergency driving situation and a method for controlling driving thereof, the method being capable of controlling the hybrid electric vehicle with a specialized control logic different from that of a conventional hybrid electric vehicle, thereby achieving the maximum acceleration performance of the vehicle.

The objectives of the present disclosure are not limited to those mentioned above, and other objectives not mentioned can be clearly understood by those having ordinary skill in the art from the description provided hereinafter.

According to an embodiment of the present disclosure, a method for controlling driving of a hybrid electric vehicle includes: collecting driving data while the hybrid electric vehicle is driven; determining, based on the driving data, whether the hybrid electric vehicle enters a first mode corresponding to emergency driving of the hybrid electric vehicle or a second mode corresponding to control in preparation for the emergency driving; and controlling the hybrid electric vehicle in accordance with a mode that the hybrid electric vehicle enters among the first mode and the second mode.

In an aspect, the driving data may include at least one of emergency light blinking information of the hybrid electric vehicle, accelerator position sensor (APS) change rate, input information of a transmission, current driving location, driving road information, or vehicle speed.

In an aspect, controlling of the hybrid electric vehicle may include, when the first mode is entered, allowing an engine clutch disposed between a driving motor and an engine of the hybrid electric vehicle to be engaged, and allowing the hybrid electric vehicle to be driven with at least one driving assist function turned off.

In an aspect, the driving assist function may include a lane departure prevention assist function, a green zone drive mode (GDM) function, and an automatic driving mode switching function of the hybrid electric vehicle.

In an aspect, controlling of the hybrid electric vehicle may further include: when the hybrid electric vehicle is stopped after entering the first mode, allowing a battery to be charged with an idle charge amount higher than a default idle charge amount.

In an aspect, controlling the hybrid electric vehicle may further include allowing the hybrid electric vehicle to enter a third mode corresponding to standby for re-entry to the first mode when the hybrid electric vehicle is stopped in a park stage (P-stage) after entering the first mode.

In an aspect, controlling of the hybrid electric vehicle may include, when the third mode is entered, shifting a transmission of the hybrid electric vehicle to a neutral stage (N-stage) and allowing a battery to be charged using the driving motor of the hybrid electric vehicle.

In an aspect, controlling of the hybrid electric vehicle may further include, when the first mode is not entered and an ignition-off signal is input, allowing the hybrid electric vehicle to enter the second mode and controlling the hybrid electric vehicle in accordance with the second mode.

In an aspect, controlling of the hybrid electric vehicle may include, when the second mode is entered, allowing a battery to be charged in an idle state of an engine before ignition of the hybrid electric vehicle is turned off.

In an aspect, allowing the battery to be charged may include adjusting a time for charging the battery in accordance with whether a location of the hybrid electric vehicle is indoors or outdoors when the battery is charged in the idle state of the engine.

According to another embodiment of the present disclosure, a hybrid electric vehicle includes: an engine; and a controller configured to collect driving data while the hybrid electric vehicle is driven, determine, based on the driving data, whether the hybrid electric vehicle enters a first mode corresponding to emergency driving of the hybrid electric vehicle or a second mode corresponding to control in preparation for the emergency driving, and control the hybrid electric vehicle in accordance with a mode that the hybrid electric vehicle enters among the first mode and the second mode.

In an aspect, the controller may be configured to, when the first mode is entered, allow an engine clutch disposed between a driving motor of the hybrid electric vehicle and the engine to be engaged, and allow the hybrid electric vehicle to be driven with at least one driving assistance function turned off.

In an aspect, the controller may be configured to, when the hybrid electric vehicle is stopped after entering the first mode, allow a battery to be charged with an idle charge amount higher than a default idle charge amount.

In an aspect, the controller may be configured to, when the hybrid electric vehicle is stopped in a P-stage after entering the first mode, allow the hybrid electric vehicle to enter a third mode corresponding to standby for re-entry to the first mode.

In an aspect, the controller may be configured to, when the third mode is entered, shift a transmission of the hybrid electric vehicle to an N-stage and allow a battery to be charged using the driving motor of the hybrid electric vehicle.

In an aspect, the controller may be configured to, when the first mode is not entered and an ignition-off signal is input, allow the hybrid electric vehicle to enter the second mode and control the hybrid electric vehicle.

In an aspect, the controller may be configured to, when the second mode is entered, allow a battery to be charged in an idle state of the engine before ignition of the hybrid electric vehicle is turned off.

In an aspect, the controller may be configured to adjust a time for charging the battery in accordance with whether a location of the hybrid electric vehicle is indoors or outdoors when the battery is charged in the idle state of the engine.

According to embodiments of the present disclosure, in a situation in which a hybrid electric vehicle that utilizes a hybrid powertrain requires emergency driving differentiated from a general driving condition, a different control logic for controlling driving of the hybrid electric vehicle can be used. Thus, it is possible to provide a specialized control logic suitable for the particular driving situation of the hybrid electric vehicle, and to achieve the maximum acceleration performance of the hybrid electric vehicle in emergency situations such as patient transfer.

The effects of the present disclosure are not limited to those mentioned above, and other effects not mentioned can be clearly understood by those having ordinary skill in the art with reference to the following description and the accompanying drawings.

BRIEF DESCRIPTION OF THE DRAWINGS

The above and other objectives, features, and other advantages of the present disclosure may be more clearly understood from the following detailed description when taken in conjunction with the accompanying drawings, in which.

DETAILED DESCRIPTION

Hereinafter, embodiments of the present disclosure are described in detail with reference to the accompanying drawings, in which identical or similar constituent elements are given the same reference numerals regardless of the reference numerals of the drawings, and repeated description thereof may be omitted. The component suffixes "module" and "part" used in the following description are given or mixed together only considering the ease of creating the specification, and have no meanings or roles that are distinguished from each other by themselves. Throughout the specification, when it is determined that a detailed description of well-known technologies would obscure the gist of the present disclosure, the detailed description thereof may be omitted. In addition, the accompanying drawings are merely intended for easy understanding of the embodiments disclosed herein and thus the embodiments of the present disclosure are not limited by the accompanying drawings, and it should be understood that the embodiments include all changes, equivalents, and substitutions within the spirit and scope of the present disclosure.

It should be understood that, although the terms "first", "second", etc., may be used herein to describe various elements, these elements should not be limited by these terms. These terms are only used to distinguish one element from another element.

It should be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly linked" to another element, there are no intervening elements present.

As used herein, the singular forms "a", "an", and "the" are intended to include the plural forms as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

In addition, an expression "unit" or "control unit" included in a term, such as a motor control unit (MCU) or a hybrid control unit (HCU), is only a term widely used in the naming of a controller controlling a specific function of a vehicle, but should not be understood as a generic function unit. For example, each controller may include a communication device communicating with another controller or a sensor to control a corresponding function to which the controller is in charge; a memory storing an operating system (OS), logic commands, input/output information, and the like; and one or more processors performing determination, calculation, decision, and the like required for the control of the corresponding function.

Prior to description of a driving control method for a hybrid electric vehicle 100 according to embodiments of the present disclosure, example structure and control system of the hybrid electric vehicle 100 applicable to embodiments are described with reference to FIGS. 1 and 2.

Figure 1:
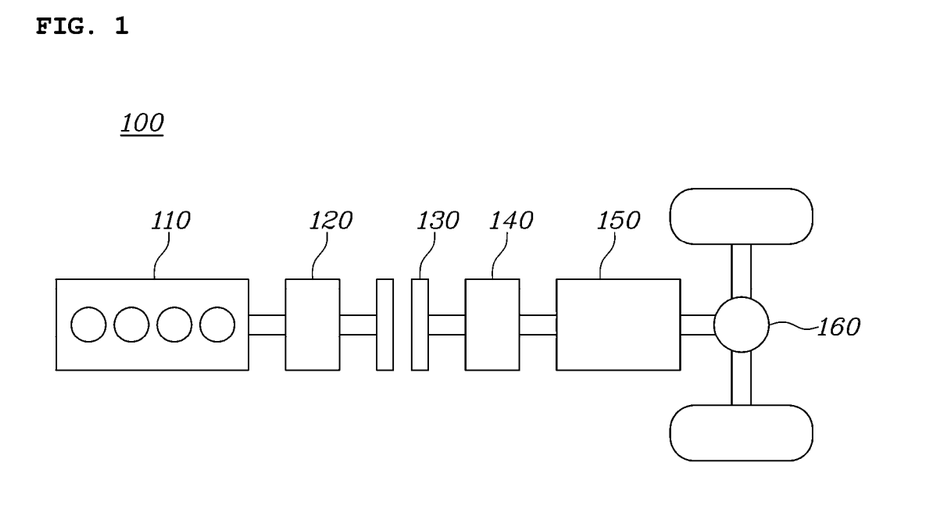
FIG. 1 is a schematic view illustrating an example of the configuration of a powertrain of a hybrid electric vehicle according to an embodiment of the present disclosure.

FIG. 1 is a schematic view illustrating an example configuration of a powertrain of a hybrid electric vehicle 100 according to an embodiment of the present disclosure.

Referring to FIG. 1, a powertrain of the hybrid electric vehicle 100 may comprise a parallel type hybrid system in which two motors 120 and 140 and an engine clutch 130 are mounted between an internal combustion engine (ICE) 110 and a transmission 150. The parallel type hybrid system may also be referred to as a transmission mounted electric drive (TIED) hybrid system because the motor 140 is always connected to an input end of the transmission 150.

In an embodiment, the first motor 120 among the two motors 120 and 140 is disposed between the engine 110 and a first end of the engine clutch 130, and an engine shaft of the engine 110 and a first motor shaft of the first motor 120 may be directly connected to each other to be always rotated in conjunction with each other.

A first end of a second motor shaft of the second motor 140 may be connected to a second end of the engine clutch 130, and a second end of the second motor shaft may be connected to the input end of the transmission 150.

The second motor 140 may have a greater power than the first motor 120. The second motor 140 may serve as a driving motor. In addition, the first motor 120 may serve as a starter motor for cranking the engine 110 when the engine 110 is on, may recover the rotational energy of the engine 110 through power generation when the engine is off, and may perform power generation with power of the engine 110 while the engine 110 is running.

In the hybrid electric vehicle 100 having the powertrain as illustrated in FIG. 1, when a driver depresses an accelerator pedal after ignition-on (e.g., HEV Ready), the second motor 140 is driven first with power from a battery (not illustrated) in a situation in which the engine clutch 130 is opened. Then, the power from the second motor 140 is transmitted to wheels through the transmission 150 and a final drive (FD) 160 so as to drive the wheels (i.e., an EV mode). When greater driving force is required in response to gradual acceleration of the vehicle, the engine 110 may be cranked by operating the first motor 120.

Consequently, when the error in the number of revolutions between the engine 110 and the second motor 140 is within a predetermined range, the engine clutch 130 is engaged to connect the engine 110 and the second motor 140, thereby allowing the engine 110 and the second motor 140 to be rotated in conjunction with each other (i.e., transition from the EV mode to an HEV mode). Accordingly, power output from the second motor 140 may be lowered and power output from the engine 110 may be increased through a torque blending process, thereby satisfying a driver's required torque. In the HEV mode, the engine 110 may satisfy most of the required torque, and the error between an engine torque and the required torque may be compensated through at least one of the first motor 120 and the second motor 140. For example, when the engine 110 outputs a torque greater than the required torque in consideration of the efficiency of the engine 110, the first motor 120 or the second motor 140 may generate power in an amount corresponding to the surplus of the engine torque, and on the other hand, when the engine torque is less than the required torque, at least one of the first motor 120 and the second motor 140 may output torque in an amount corresponding to the deficiency of the engine torque.

When a predetermined engine off condition is satisfied, for example, the vehicle is decelerated, the engine clutch 130 is opened and the engine 110 is stopped (i.e., transition from the HEV mode to the EV mode). At this time, the vehicle charges the battery (not illustrated) with electricity generated by the second motor 140 using driving force of the wheels. This is referred to as braking energy regeneration or regenerative braking.

In general, the transmission 150 may be a stepped transmission or a multi-plate clutch, e.g., a dual clutch transmission (DCT).

Figure 2:
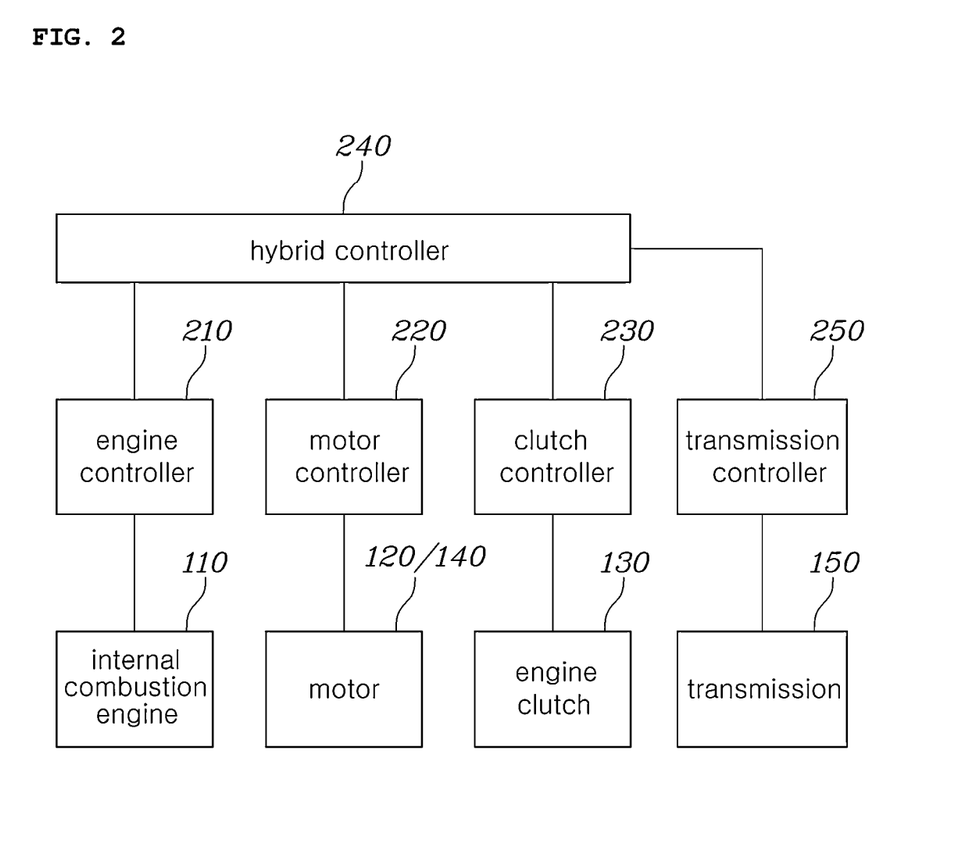
FIG. 2 is a block diagram illustrating an example of the configuration of a control system of the hybrid electric vehicle according to the embodiment of the present disclosure.

FIG. 2 is a block diagram illustrating an example of the configuration of a control system of the hybrid electric vehicle 100 according to the embodiment of the present disclosure.

Referring to FIG. 2, in the hybrid electric vehicle 100 to which embodiments of the present disclosure are applicable, the internal combustion engine 110 may be controlled by an engine controller 210, the torque of each of the first motor 120 and the second motor 140 may be controlled by a motor controller 220, e.g., a motor control unit (MCU), and the engine clutch 130 may be controlled by a clutch controller 230. The engine controller 210 may also referred to as an engine management system (EMS). The transmission 150 may be controlled by a transmission controller 250.

The motor controller 220 may control a gate drive unit (not illustrated) with a pulse width modulation (PWM) control signal on the basis of a motor angle, a phase voltage, a phase current, a required torque, and the like of each of the motors 120 and 140, and the gate drive unit may control an inverter (not illustrated) that drives each of the motors 120 and 140 in response to the control signal.

Each of the controllers may be connected to a hybrid controller 240, e.g., a hybrid controller unit (HCU), controlling the overall powertrain including a mode switching process as a higher-level controller. Under the control of the hybrid controller 240, each of the controllers may provide at least one of information required for engine clutch control during gear shifting and changing of the driving mode and/or information required for engine stop control to the hybrid controller 240, or perform an operation in response to a control signal.

For example, the hybrid controller 240 may determine whether to perform switching between the EV mode and the HEV mode or between a charge depleting (CD) mode and charge sustaining (CS) mode (in the case of a plug-in hybrid electric vehicle (PHEV)). In this regard, the hybrid controller 240 may determine a point in time at which the engine clutch 130 is to be opened, and perform hydraulic control when the engine clutch 130 is opened. In addition, the hybrid controller 240 may determine the state of the engine clutch 130 (e.g., the engine clutch 130 being locked-up, slipping, or opened), and control a point in time at which the injection of fuel to the engine 110 is to be stopped. Furthermore, the hybrid controller 240 may control the recovery of the rotational energy of the engine 110 by transmitting a torque command for controlling the torque of the first motor 120 for the engine stop control to the motor controller 220. In addition, in order to satisfy the required torque, the hybrid controller 240 may determine the state of each driving source 110, 120, 140 to determine a required driving force to be shared by each driving source 110, 120, 140, and transmit a torque command to the controllers 210 and 220 that control each driving source 110, 120, 140.

It should be apparent to those having ordinary skill in the art that the connection relationship between and the functions/classification of the above-described controllers are illustrative, and the controllers are not limited to the names thereof. For example, the hybrid controller 240 may be configured such that the function of the hybrid controller 240 is replaced by one of other controllers or distributed to two or more of the other controllers.

The above-described configurations illustrated in FIGS. 1 and 2 are only example configurations of the hybrid electric vehicle 100, and it should be apparent to those having ordinary skill in the art that the hybrid electric vehicle 100 applicable to embodiments of the present disclosure is not limited to those configurations.

In one embodiment of the present disclosure, there is proposed a method of collecting driving data of the hybrid electric vehicle 100, determining whether the vehicle enters a mode corresponding to emergency driving or a mode corresponding to control in preparation for the emergency driving on the basis of the collected driving data, and controlling driving of the vehicle in accordance with a mode that the vehicle enters. An example configuration of a controller 300 for controlling driving of the vehicle in accordance with a mode that the vehicle enters is described with reference to FIG. 3.

Figure 3:
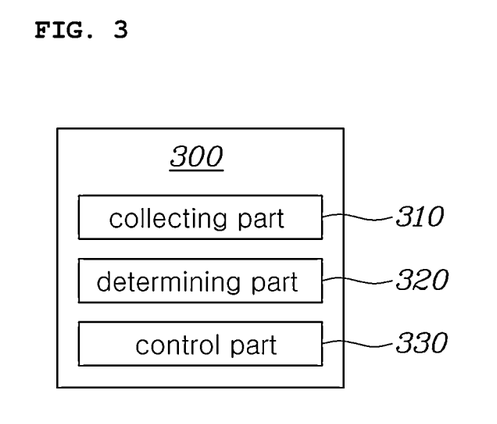
FIG. 3 is a block diagram illustrating a controller performing driving control of the hybrid electric vehicle according to the embodiment of the present disclosure.

FIG. 3 is a block diagram illustrating a controller 300 performing driving control of the hybrid electric vehicle 100 according to the embodiment of the present disclosure.

Referring to FIG. 3, the controller 300 according to an embodiment may be configured to collect driving data while the vehicle is driven, determine whether the vehicle enters a first mode corresponding to emergency driving of the vehicle or a second mode corresponding to control in preparation for the emergency driving on the basis of the collected driving data, and control the vehicle in accordance with a mode that the vehicle enters among the first mode and the second mode. The controller 300 may include a collecting part 310, a determining part 320, and a control part 330.

The collecting part 310 may be configured to collect driving data while the hybrid electric vehicle 100 is driven. For example, the collecting part 310 may be configured to collect driving data including at least one of emergency light blinking information of the vehicle, accelerator position sensor (APS) change rate, input information of the transmission 150, current driving location, driving road information, and vehicle speed. The collecting part 310 may provide the collected driving data to the determining part 320.

The determining part 320 may be configured to determine which driving mode the vehicle is to enter to control the driving of the vehicle on the basis of the driving data collected by the collecting part 310. For example, the determining part 320 may be configured to determine whether the vehicle enters the first mode corresponding to the emergency driving of the vehicle or the second mode corresponding to the control in preparation for the emergency driving. In an aspect, the determining part 320 may be configured to determine whether an entry condition for the first mode or the second mode is satisfied with a part or combination of the driving data collected by the collecting part 310. Also, the determining part 320 may be configured to determine whether an entry condition for a third mode is satisfied by checking driving data collected while the vehicle is driven in the first mode.

The control part 330 may be configured to differently perform the driving control of the vehicle depending on the results determined by the determining part 320. For example, when the entry condition for the first mode is satisfied in the determining part 320 and thus the first mode is entered, the control part 330 may allow the engine clutch 130 disposed between the driving motor 140 and the engine 110 of the vehicle to be engaged and allow the vehicle to be driven with at least one driving assist function turned off. On the other hand, when the entry condition for the second mode is satisfied in the determining part 320 and thus the second mode is entered, the control part 330 may allow the battery (not illustrated) to be charged in an idle state of the engine 110. Furthermore, when the entry condition for the third mode is satisfied while the vehicle is driven in the first mode, the control part 330 may allow the battery (not illustrated) to be charged using the driving motor 140.

Figure 4:
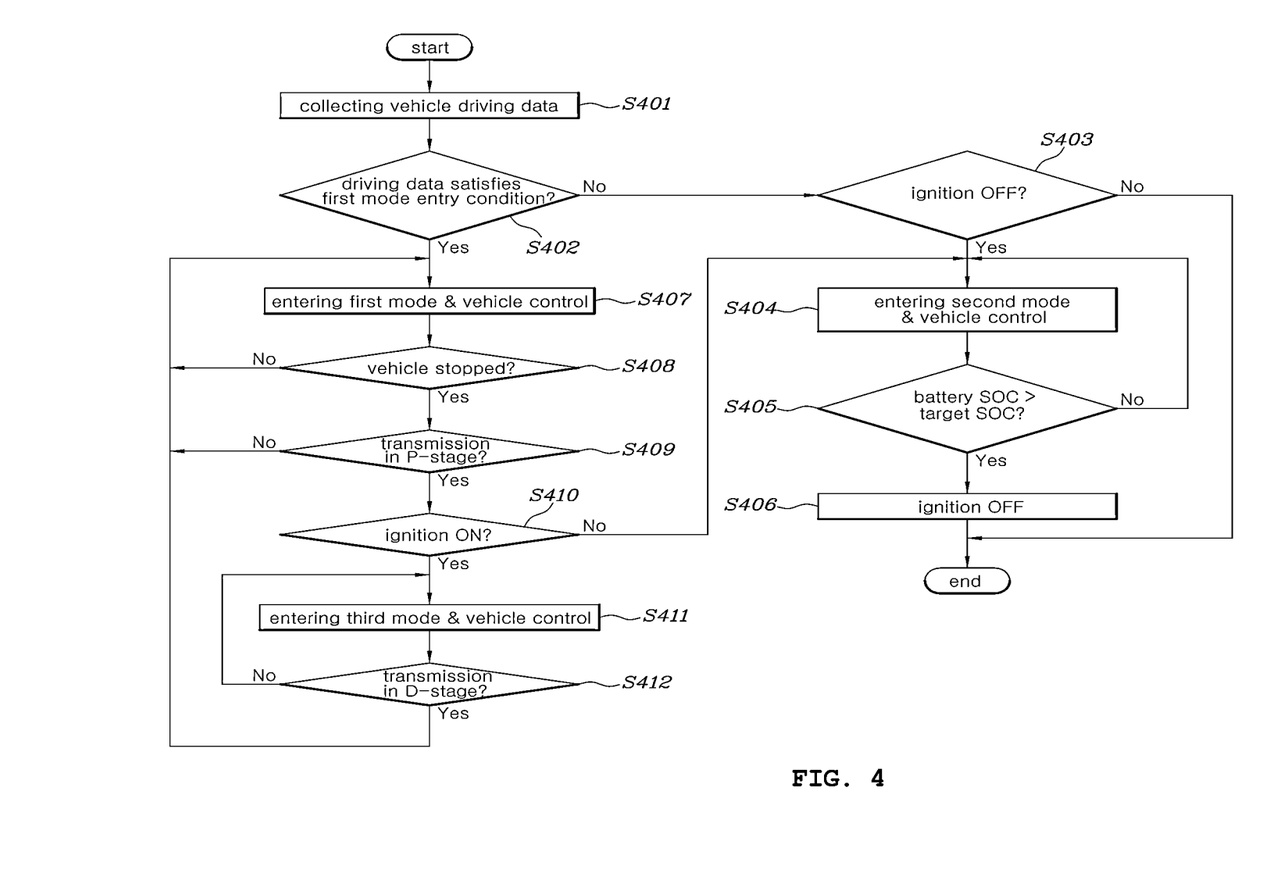
FIG. 4 is a flowchart illustrating a driving control method for a hybrid electric vehicle according to an embodiment of the present disclosure.

Hereinafter, a driving control method for a hybrid electric vehicle 100 according to an embodiment on the basis of the configuration of the hybrid electric vehicle 100 described above with reference to FIGS. 1 to 3 is described with reference to FIG. 4. In FIG. 4, for convenience of description, it is assumed that the controller 300 illustrated in FIG. 3 is implemented as the hybrid controller (HCU) 240.

FIG. 4 is a flowchart illustrating a driving control method for the hybrid electric vehicle 100 according to an embodiment of the present disclosure.

Referring to FIG. 4, at step S402, the hybrid controller 240 may collect driving data while the vehicle is driven. The driving data collected by the hybrid controller 240 may include at least one of emergency light blinking information of the vehicle, APS change rate, input information of the transmission 150, current driving location, driving road information, and vehicle speed. It should be noted that this just example driving data that may be collected by the hybrid controller 240, and the present disclosure is not limited thereto.

At step S402, the hybrid controller 240 may check whether an entry condition for a first mode corresponding to emergency driving of the vehicle is satisfied on the basis of the collected driving data. For example, the entry condition for the first mode may be a situation in which the emergency light is blinking, the APS change rate is rapidly increasing, the vehicle speed is equal to or higher than a reference speed when a front traffic light is red, and the vehicle travels in a direction different from the direction of the driving lane, such as when the vehicle crosses over the centerline or travels in the reverse direction on a one-way street. When the collected driving data of the vehicle satisfies the entry condition for the first mode (Yes in S402), the method may proceed to step S407 at which the hybrid controller 240 may determine that the emergency driving of the vehicle is necessary, allow the vehicle to enter the first mode, and control the vehicle. Prior to describing a method of controlling the vehicle by entering the first mode, a case in which the entry condition for the first mode is not satisfied is described.

When the collected driving data does not satisfy the entry condition for the first mode (No in S402), the method may proceed to step S403 at which the hybrid controller 240 may check whether the vehicle is in an ignition-off state. When the vehicle is in the ignition-off state (Yes in S403), the method may proceed to step S404 at which the hybrid controller 240 may allow the vehicle to enter a second mode and control the vehicle. For example, when the second mode is entered, the hybrid controller 240 may allow the battery (not illustrated) to be charged in an idle state of the engine 110 before the ignition of the vehicle is turned off. In an aspect, the hybrid controller 240 may check the location of the vehicle and adjust the time for charging the battery (not illustrated) in accordance with whether the location of the vehicle is indoors or outdoors. This is because exhaust gas may be generated as the battery (not illustrated) is charged in the idle state of the engine 110, and it is undesirable for the exhaust gas to be discharged indoors for a long period of time. Therefore, in an embodiment, the hybrid controller 240 may adjust the time for charging the battery (not illustrated) by checking whether the location of the vehicle is indoors or outdoors.

In some aspects, the second mode in the present disclosure may be referred to as a control mode for preparing for the next emergency driving after the driving in the first mode is finished. In an emergency driving situation, the vehicle is driven by using the maximum available power, and a state of charge (SOC) of the battery (not illustrated) provided in the hybrid electric vehicle 100 also affects the available power of the vehicle. Thus, in order to use the maximum available power of the vehicle, there may be a need to sufficiently secure the SOC of the battery (not illustrated). Accordingly, when the vehicle is in an ignition-off state, the ignition-off may be delayed and the battery (not illustrated) may be charged in the idle state of the engine 110. At step 405, the hybrid controller 240 may compare the SOC of the battery (not illustrated) with a target SOC when the battery (not illustrated) is charged in the idle state of the engine 110. When the SOC of the battery (not illustrated) exceeds the target SOC (Yes in S405), the hybrid controller 240 may end the charging of the battery (not illustrated) and turn off the ignition of the vehicle (S406). Consequently, by performing the charging of the battery (not illustrated) before the ignition of the vehicle is turned off to secure the SOC of the battery (not illustrated), it is possible to prepare for the next emergency driving situation.

Referring still to FIG. 4, when the entry condition for the first mode is satisfied (Yes in S402), the method may proceed to step S407 at which the hybrid controller 240 may allow the vehicle to enter the first mode, allow the engine clutch 130 disposed between the driving motor 140 and the engine 110 of the vehicle to be engaged, and allow the vehicle to be driven with at least one driving assist function turned off. The hybrid controller 240 may allow the engine clutch 130 disposed between the driving motor 140 of the vehicle and the engine 110 to be engaged, thereby allowing the vehicle to output power in an amount corresponding to power required by the driver.

In an example, when the vehicle is driven without the driving assist function turned off, there may be a problem in that the activated driving assist function impedes maneuver necessary for emergency driving in a situation in which the emergency driving is required. For example, when a lane departure prevention assist function is turned on, the assist function may impede the maneuver, such as a maneuver involving in steering or performing braking to keep the vehicle in the lane in a situation in which an urgent lane change or centerline encroachment is required. Accordingly, the hybrid controller 240 may allow the vehicle to be driven while the at least one driving assist function is turned off. The driving assist function of the vehicle may include the lane departure prevention assist function, a green zone drive mode (GDM) function, and an automatic driving mode switching function of the vehicle. It is noted that these are just examples of driving assist functions that the hybrid controller 240 may allow to be turned off and the present disclosure is not limited thereto. In some embodiments, the hybrid controller 240 may allow all the aforementioned driving assist functions of the vehicle to be turned off.

At step S408, the hybrid controller 240 may check whether the vehicle is stopped when the hybrid electric vehicle 100 is driven in the first mode. The hybrid controller 240 may determine whether to maintain vehicle control in the first mode or to perform vehicle control in another mode in accordance with whether the vehicle is stopped. When the vehicle is not stopped (No in S408), the hybrid controller 240 may maintain the vehicle control in the first mode. However, when the vehicle is stopped (Yes in S408), the method may proceed to step S409 at which the hybrid controller 240 may check whether a park stage (P-stage) of the transmission 150 of the vehicle is input. When the P-stage of the transmission 150 is not input (No in S409), the hybrid controller 240 may maintain the vehicle control in the first mode, and since the vehicle is in a stopped state, the hybrid controller 240 may charge the battery (not illustrated) in the idle state of the engine 110. When the vehicle is stopped and the SOC of the battery (not illustrated) is not consumed, the battery (not illustrated) may be charged to maintain the SOC at equal to or higher than a predetermined level.

In an aspect, an idle charge amount charged to the battery (not illustrated) in the idle state of the engine 110 when the vehicle is stopped while driven in the first mode may be a higher charge amount than a default idle charge amount. The default idle charge amount may mean electric power to charge the battery (not illustrated) as a hybrid starter generator (HSG) generates electric power using power of the engine 110 when the engine 110 is controlled in the idle state in a series mode. Therefore, in the present disclosure, charging the battery (not illustrated) in the idle state of the engine 110 when the vehicle is stopped while driven in the first mode may mean that the battery (not illustrated) is charged with a relatively large charge amount because at least one of RPM or torque is high compared to idle control preset in the engine 110.

When the vehicle is stopped and the P-stage of the transmission 150 is input (Yes in S409), the method may proceed to step S411 at which the hybrid controller 240 may allow the vehicle to enter a third mode corresponding to standby for re-entry to the first mode. When the vehicle is stopped while driven in the first mode and the P-stage of the transmission 150 is input, this may indicate that the driving in the first mode is not completely finished. Accordingly, when the P-stage of the transmission 150 is input (Yes in S409), the method may proceed to step S410 at which the hybrid controller 240 may check whether the ignition of the vehicle is continuously turned on.

In an aspect, when the P-stage of the transmission 150 is input (Yes in S409) and the vehicle is maintained in an ignition-on state (Yes in S410), the method may proceed to step S411 at which the hybrid controller 240 may allow the vehicle to enter the third mode S411. When the third mode is entered, the hybrid controller 240 may shift the transmission 150 to a neutral stage (N-stage) and allow the battery (not illustrated) to be charged using the driving motor 140 of the vehicle at step S411. Consequently, by securing the SOC of the battery (not illustrated), the vehicle can use the maximum available power when the first mode is re-entered, i.e., transition from the third mode the first mode, thereby exhibiting the maximum acceleration performance. As the maximum acceleration performance of the vehicle is achieved, the vehicle can be driven smoothly in an emergency driving situation (control to the first mode). At step S412, the hybrid controller 240 may check whether a drive stage (D-stage) of the transmission 150 is input, and when the D-stage of the transmission 150 is input (Yes in S412), may allow the vehicle to be driven in the first mode again.

Although specific embodiments of the present disclosure have been described for illustrative purposes, those having ordinary skill in the art can appreciate that various modifications, additions, and substitutions are possible, without departing from the scope and spirit of the disclosure as disclosed in the appended claims.

The present disclosure described above can be implemented in a program recorded medium as computer-readable codes. The computer-readable media include all kinds of recording devices in which data readable by a computer system are stored, such as hard disk drive (HDD), solid state disk (SSD), silicon disk drive (SDD), ROM, RAM, CD-ROM, magnetic tapes, floppy disks, optical data storage devices, and the like.

As publicly known in the art, some of example forms may be illustrated in the accompanying drawings from the viewpoint of function blocks, units, parts, and/or modules. Those having ordinary skill in the art should understand that such blocks, units, parts, and/or modules are physically implemented by electronic (or optical) circuits such as logic circuits, discrete components, processors, hard wired circuits, memory devices and wiring connections. When the blocks, units, parts, and/or modules are implemented by processors or other similar hardware, the blocks, units and modules may be programmed and controlled through software (for example, codes) in order to perform various functions discussed in the present disclosure. Furthermore, each of the blocks, units, pars and/or modules may be implemented by dedicated hardware or a combination of dedicated hardware for performing some functions and a processor for performing another function (for example, one or more programmed processors and related circuits.

The above embodiments are to be construed in all aspects as illustrative and not restrictive. The scope of the disclosure should be determined by the appended claims and their legal equivalents and all changes coming within the meaning and equivalency range of the appended claims are intended to be embraced therein.

What is claimed is:

1. A method for controlling driving of a hybrid electric vehicle, the method comprising:
    collecting driving data while the hybrid electric vehicle is driven;
    determining, based on the driving data, whether the hybrid electric vehicle enters a first mode corresponding to emergency driving of the hybrid electric vehicle or a second mode corresponding to control in preparation for the emergency driving; and
    controlling the hybrid electric vehicle in accordance with a mode that the hybrid electric vehicle enters among the first mode and the second mode, wherein when the first mode is entered, controlling the hybrid electric vehicle includes
        allowing an engine clutch disposed between a driving motor and an engine of the hybrid electric vehicle to be engaged, and
        allowing the hybrid electric vehicle to be driven with at least one driving assist function turned off, and
    wherein the driving data comprises at least one of emergency light blinking information of the hybrid electric vehicle, accelerator position sensor (APS) change rate, input information of a transmission, current driving location, driving road information, or vehicle speed.

2. The method of claim 1, wherein, when the first mode is not entered and an ignition-off signal is input, controlling the hybrid electric vehicle includes:
    allowing the hybrid electric vehicle to enter the second mode, and
    controlling the hybrid electric vehicle in accordance with the second mode.

3. The method of claim 2, wherein controlling the hybrid electric vehicle based on the second mode includes: allowing a battery to be charged in an idle state of an engine before ignition of the hybrid electric vehicle is turned off.

4. The method of claim 3, wherein allowing the battery to be charged includes: adjusting a time for charging the battery in accordance with whether a location of the hybrid electric vehicle is indoors or outdoors when the battery is charged in the idle state of the engine.

5. The method of claim 1, wherein controlling of the hybrid electric vehicle further includes allowing a battery to be charged with an idle charge amount higher than a default idle charge amount when the hybrid electric vehicle is stopped after entering the first mode.

6. The method of claim 1, wherein controlling of the hybrid electric vehicle further includes allowing the hybrid electric vehicle to enter a third mode corresponding to standby for re-entry to the first mode when the hybrid electric vehicle is stopped in a park stage (P-stage) after entering the first mode.

7. The method of claim 6, wherein, when the third mode is entered, controlling of the hybrid electric vehicle includes:
    shifting the transmission of the hybrid electric vehicle to a neutral stage (N-stage), and
    allowing a battery to be charged using the driving motor of the hybrid electric vehicle.

8. The method of claim 1, wherein the at least one driving assist function comprises a lane departure prevention assist function, a green zone drive mode (GDM) function, and an automatic driving mode switching function of the hybrid electric vehicle.

9. A hybrid electric vehicle comprising:
    an engine; and
    a controller configured to:
        collect driving data while the hybrid electric vehicle is driven,
        determine, based on the driving data, whether the hybrid electric vehicle enters a first mode corresponding to emergency driving of the hybrid electric vehicle or a second mode corresponding to control in preparation for the emergency driving, and
        control the hybrid electric vehicle in accordance with a mode that the hybrid electric vehicle enters among the first mode and the second mode, wherein the controller is configured to, when the first mode is entered,
            allow an engine clutch disposed between a driving motor and the engine of the hybrid electric vehicle to be engaged, and
            allow the hybrid electric vehicle to be driven with at least one driving assistance function turned off,
    wherein the controller is configured to, when the first mode is not entered and an ignition-off signal is input:
        allow the hybrid electric vehicle to enter the second mode, and
        control the hybrid electric vehicle in accordance with the second mode, wherein the controller is configured to, when the second mode is entered, allow a battery to be charged in an idle state of the engine before ignition of the hybrid electric vehicle is turned off, and wherein the controller is configured to adjust a time for charging the battery based on whether a location of the hybrid electric vehicle is indoors or outdoors when the battery is charged in the idle state of the engine.

10. A hybrid electric vehicle comprising:

an engine; and a controller configured to:
- collect driving data while the hybrid electric vehicle is driven,
- determine, based on the driving data, whether the hybrid electric vehicle enters a first mode corresponding to emergency driving of the hybrid electric vehicle or a second mode corresponding to control in preparation for the emergency driving, and
- control the hybrid electric vehicle in accordance with a mode that the hybrid electric vehicle enters among the first mode and the second mode, wherein the controller is configured to, when the first mode is entered,
  - allow an engine clutch disposed between a driving motor and the engine of the hybrid electric vehicle to be engaged, and
  - allow the hybrid electric vehicle to be driven with at least one driving assistance function turned off, wherein the driving data comprises at least one of emergency light blinking information of the hybrid electric vehicle, accelerator position sensor (APS) change rate, input information of a transmission, current driving location, driving road information, or vehicle speed.

11. The hybrid electric vehicle of claim 10, wherein the controller is configured to, when the first mode is not entered and an ignition-off signal is input:
- allow the hybrid electric vehicle to enter the second mode, and
- control the hybrid electric vehicle in accordance with the second mode.

12. The hybrid electric vehicle of claim 11, wherein the controller is configured to, when the second mode is entered, allow a battery to be charged in an idle state of the engine before ignition of the hybrid electric vehicle is turned off.

13. The hybrid electric vehicle of claim 12, wherein the controller is configured to adjust a time for charging the battery based on whether a location of the hybrid electric vehicle is indoors or outdoors when the battery is charged in the idle state of the engine.

14. The hybrid electric vehicle of claim 10, wherein the controller is configured to allow the hybrid electric vehicle to enter a third mode corresponding to standby for re-entry to the first mode when the hybrid electric vehicle is stopped in a park stage (P-stage) after entering the first mode.

15. The hybrid electric vehicle of claim 14, wherein the controller is configured to, when the third mode is entered:
- shift the transmission of the hybrid electric vehicle to a neutral stage (N-stage), and
- allow a battery to be charged using the driving motor of the hybrid electric vehicle.

16. The hybrid electric vehicle of claim 10, wherein the controller is configured to allow a battery to be charged with an idle charge amount higher than a default idle charge amount when the hybrid electric vehicle is stopped after entering the first mode.

* * * * *